(12) United States Patent
Wang et al.

(10) Patent No.: US 9,568,759 B2
(45) Date of Patent: Feb. 14, 2017

(54) MANUFACTURING METHOD OF TOUCH DISPLAY PANEL

(71) Applicant: SHENZHEN CHINA STAR OPTOELECTRONICS TECHNOLOGY CO., LTD., Shenzhen, Guangdong (CN)

(72) Inventors: Cong Wang, Guangdong (CN); Peng Du, Guangdong (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 134 days.

(21) Appl. No.: 14/650,312

(22) PCT Filed: Feb. 13, 2015

(86) PCT No.: PCT/CN2015/073028
§ 371 (c)(1),
(2) Date: Jun. 8, 2015

(87) PCT Pub. No.: WO2016/123819
PCT Pub. Date: Aug. 11, 2016

(65) Prior Publication Data
US 2016/0370624 A1    Dec. 22, 2016

(30) Foreign Application Priority Data

Feb. 6, 2015    (CN) .......................... 2015 1 0063248

(51) Int. Cl.
G02F 1/1333    (2006.01)
G02F 1/1343    (2006.01)
G02F 1/1335    (2006.01)

(52) U.S. Cl.
CPC ....... *G02F 1/13338* (2013.01); *G02F 1/13439* (2013.01); *G02F 1/133512* (2013.01); *G02F 1/133516* (2013.01); *G02F 2001/134318* (2013.01); *G02F 2201/121* (2013.01)

(58) Field of Classification Search
CPC ............ G02F 1/13338; G02F 1/133345; G02F 1/134336; G06F 3/044; G06F 3/0412
USPC ......................................................... 349/12
See application file for complete search history.

(56) References Cited

U.S. PATENT DOCUMENTS

2014/0327843 A1* 11/2014 Liu ..................... G02F 1/13338 349/12
2015/0253609 A1* 9/2015 Zhou ................... G02F 1/13338 438/27
2016/0026288 A1* 1/2016 Zhan ................... G02F 1/13338 345/174

* cited by examiner

*Primary Examiner* — Joseph L Williams
(74) *Attorney, Agent, or Firm* — Soroker Agmon Nordman

(57) ABSTRACT

A manufacturing method of a touch display panel is disclosed and has steps of depositing a touch-control metal layer on ail inner side of a color-filler substrate and patterning the touch-control metal layer; depositing a black matrix layer on the inner side of the color-filter substrate and patterning the black matrix layer; depositing a color photoresist layer on the inner side of the color-filter substrate and patterning the color photoresist layer; depositing a common electrode layer on the inner side of the color-filter substrate and patterning the common electrode layer; and performing cell-assembling to assemble the color-filter substrate and an array substrate together.

16 Claims, 4 Drawing Sheets

MANUFACTURING METHOD OF TOUCH DISPLAY PANEL

BACKGROUND OF THE INVENTION

Field of the Invention

The present invention relates to the field of liquid crystal display, and more particularly to a manufacturing method of a touch display panel.

Description of the Related Art

With the development of technologies, more and more electronic products require touch displays to interact with users, wherein capacitive touch displays are widely used in the display panel of the electronic devices due to characteristics of lightweight and high sensitivity.

In a traditional touch display panel the sensing wires for touch control and the driving wires are usually arranged outside the liquid crystal cell. For such structure of the touch display panel, the corresponding sensing wires and driving wires should be formed by performing etching process on the touch-control metal layer mounted outside the liquid crystal cell after the cell is formed by assembling an array substrate and a color-filter substrate together. Such manufacturing process is more complicated and the production cost is high.

Therefore, it is necessary to provide a manufacturing method of a touch display panel to overcome the problems existing in the conventional technology.

SUMMARY OF THE INVENTION

A main object of the present invention is to provide a manufacturing method of a touch display panel that has a simple manufacturing process and low manufacturing cost so as to solve the problem that conventional manufacturing method of touch display panel has a complicated process and high production cost.

In order to achieve the foregoing object, the present invention provides a manufacturing method of a touch display panel having steps of depositing a touch-control metal layer on an inner side of a color-filter substrate and patterning the touch-control metal layer to form a plurality of touch-sensing wires;

depositing a black matrix layer on the inner side of the color-filter substrate and patterning the black matrix layer to form a black matrix;

depositing a color photoresist layer on the inner side of the color-filter substrate and patterning the color photoresist layer to form color photoresist;

depositing a common electrode layer on the inner side of the color-filter substrate and patterning the common electrode layer to form a plurality of common electrodes; and performing cell-assembling to assemble the color-filter substrate and an array substrate together to form a liquid crystal cell; wherein when the touch display panel is in a display mode, the common electrode is used to transmit a common signal; when the touch display panel is in a touch-control mode, the common electrode is used to transmit a touch-control driving signal; wherein a projection of each of the touch-sensing wires on the common electrode layer is perpendicular to the each of the common electrodes; the black matrix has a width greater than a gap between the adjacent common electrodes.

In the manufacturing method of a touch display panel of the present invention, a line width of each of the touch-sensing wires is ranged from 3 mm to 9 mm.

In the manufacturing method of a touch display panel of the present invention, a line width of the common electrode is ranged from 3 mm to 9 mm.

In the manufacturing method of a touch display panel of the present invention, after the step of performing cell-assembling to assemble the color-filter substrate and an array substrate together, the manufacturing method further comprises a step of:

mounting a glass cover plate on an outer side of the color-filter substrate with an adhesive layer.

The present invention further provides another manufacturing method of a touch display panel having steps of:

depositing a touch-control metal layer on an inner side of a color-filter substrate and patterning the touch-control metal layer to form a plurality of touch-sensing wires;

depositing a black matrix layer on the inner side of the color-filter substrate and patterning the black matrix layer to form a black matrix;

depositing a color photoresist layer on the inner side of the color-filter substrate and patterning the color photoresist layer to form color photoresist:

depositing a common electrode layer on the inner side of the color-filter substrate and patterning the common electrode layer to form a plurality of common electrodes: and performing cell-assembling to assemble the color-filter substrate and an array substrate together to form a liquid crystal cell; wherein when the touch display panel is in a display mode, the common electrode is used to transmit a common signal; when the touch display panel is in a touch-control mode, the common electrode is used to transmit a touch-control driving signal.

In the manufacturing method of a touch display panel of the present invention, a projection of each of the touch-sensing wires on the common electrode layer is perpendicular to the each of the common electrodes.

In the manufacturing method of a touch display panel of the present invention, a line width of each of the touch-sensing wires is ranged from 3 mm to 9 mm.

In the manufacturing method of a touch display panel of the present invention, a line width of the common electrode is ranged from 3 mm to 9 mm.

In the manufacturing method of a touch display panel of the present invention, the black matrix has a width greater than a gap between the adjacent common electrodes.

In the manufacturing method of a touch display panel of the present invention, after the step of performing cell-assembling to assemble the color-filter substrate and an array substrate together, the manufacturing method further comprises a step of:

mounting a glass cover plate on an outer side of the color-filter substrate with an adhesive layer.

The present invention further provides another manufacturing method of a touch display panel having steps of:

depositing a black matrix layer on an inner side of a color-filter substrate and patterning the black matrix layer to form a black matrix;

depositing a color photoresist layer on the inner side of the color-filter substrate and patterning the color photoresist layer to form color photoresist;

depositing a common electrode layer on the inner side of the color-filter substrate and patterning the common electrode layer to form a plurality7 of common electrodes;

performing cell-assembling to assemble the color-filter substrate and an array substrate together to form a liquid crystal cell: and depositing a touch-control metal layer on an outer side of the color-filter substrate and patterning the touch-control metal layer to form a plurality of touch-sensing wires: wherein when the touch display panel is in a display mode, the common electrode is used to transmit a common signal; when the touch display panel is in a touch-control mode, the common electrode is used to transmit a touch-control driving signal.

In the manufacturing method of a touch display panel of the present invention, a projection of each of the touch-sensing wires on the common electrode layer is perpendicular to the each of the common electrodes.

In the manufacturing method of a touch display panel of the present invention, a line width of each of the touch-sensing wires is ranged from 3 mm to 9 mm.

In the manufacturing method of a touch display panel of the present invention, a line width of the common electrode is ranged from 3 mm to 9 mm.

In the manufacturing method of a touch display panel of the present invention, the black matrix has a width greater than a gap between the adjacent common electrodes.

In the manufacturing method of a touch display panel of the present invention, after the step of depositing a touch-control metal layer on an outer side of the color-filter substrate and patterning the touch-control metal layer to form a plurality of touch-sensing wires, the manufacturing method further comprises a step of:

mounting a glass cover plate on an outer side of the color-filter substrate with an adhesive layer.

Compared with the conventional manufacturing method of a touch display panel, the manufacturing method provided by the present invention is implemented to form both the touch-control metal layer and the common electrode layer on the inner side of the touch display panel so that the manufacturing process is simple and can lower the production cost of the touch display panel, thereby solving the problem where the conventional manufacturing method of touch display panel has a complicated process and higher production cost.

DETAILED DESCRIPTION OF THE PREFERRED EMBODIMENTS

The foregoing objects, features and advantages adopted by the present invention can be best understood by referring to the following detailed description of the preferred embodiments and the accompanying drawings. Furthermore, the directional terms described in the present invention, such as upper, lower, front, rear, left, right, inner, outer, side and etc., are only directions referring to the accompanying drawings, so that the used directional terms are used to describe and understand the present invention, but the present invention is not limited thereto.

Figure 1:
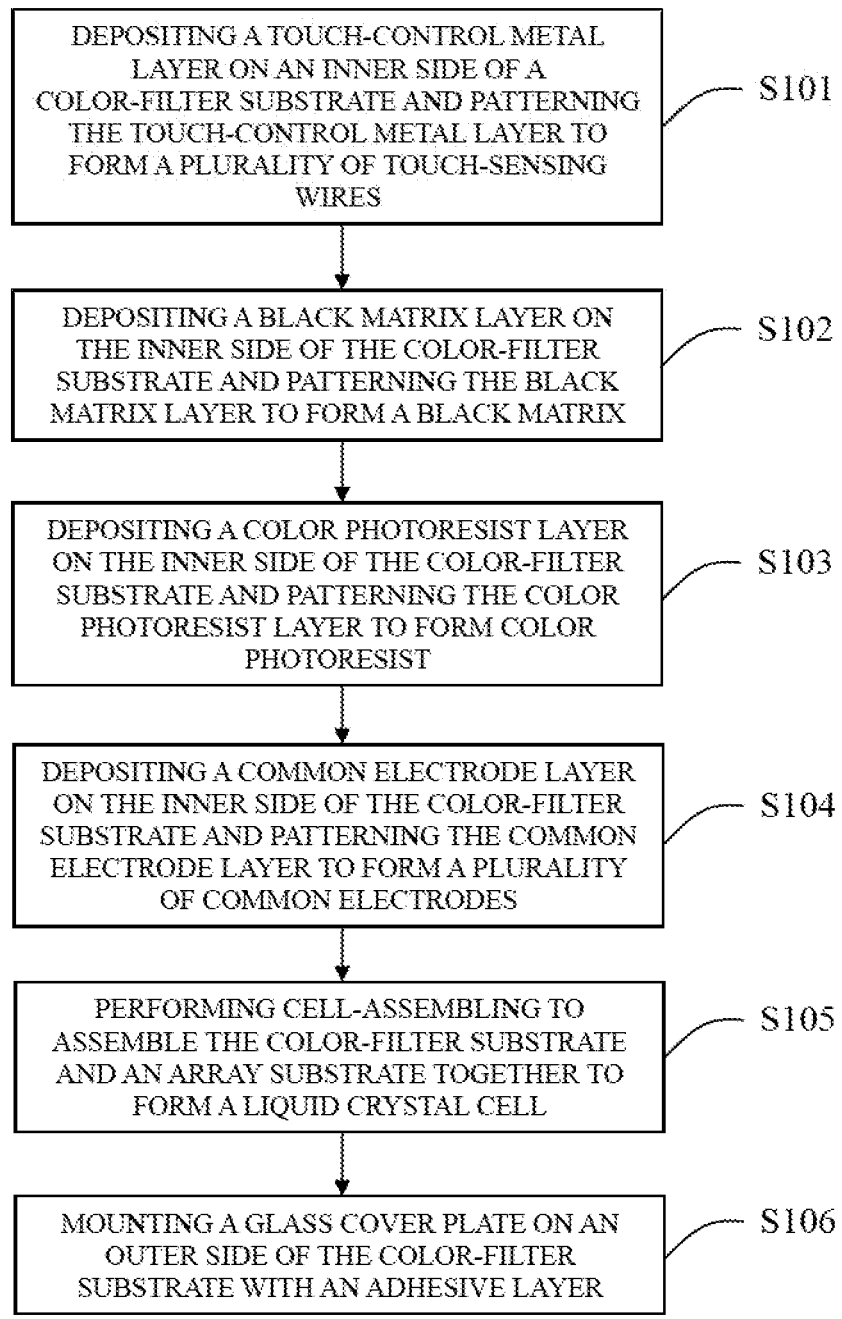
FIG. 1 is a flowchart of a manufacturing method of a touch display panel according to a first preferred embodiment of the present invention.
Figure 3:
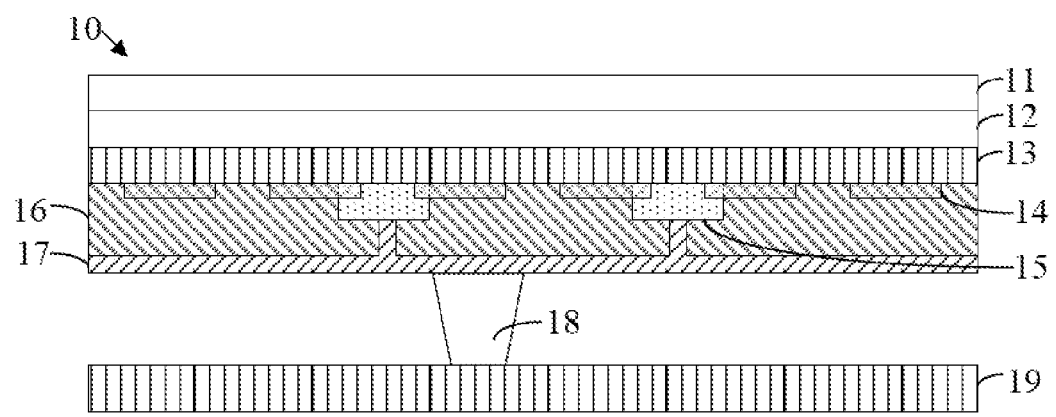
FIG. 3 is a schematic diagram showing the structure of a touch display panel formed after performing the step S106 of the manufacturing method of a touch display panel according to the first preferred embodiment of the present invention.

With reference to FIG. 1 and FIG. 3, FIG. 1 is a flowchart of a manufacturing method of a touch display panel according to a first preferred embodiment of the present invention; and FIG. 3 is a schematic diagram showing the structure of a touch display panel formed after performing a step S106 of the manufacturing method of a touch display panel according to the first preferred embodiment of the present invention. The manufacturing method of the present invention according to this preferred embodiment comprises the following steps;

Step S101: depositing a touch-control metal layer on an inner side of a color-filter substrate and patterning the touch-control metal layer to form a plurality of touch-sensing wires;

Step S102: depositing a black matrix layer on the inner side of the color-filter substrate and patterning the black matrix layer to form a black matrix;

Step S103: depositing a color photoresist layer on the inner side of the color-filter substrate and patterning the color photoresist layer to form color photoresist;

Step S104: depositing a common electrode layer on the inner side of the color-filter substrate and patterning the common electrode layer to form a plurality of common electrodes;

Step S105: performing cell-assembling to assemble the color-filter substrate and an array substrate together to form a liquid crystal cell;

Step S106: mounting a glass cover plate on an outer side of the color-filter substrate with an adhesive layer.

The manufacturing method of the touch display panel according to the present embodiment may be preferably finished in step S105.

The following description will describe the specific process of each of the steps of the manufacturing method of the touch display panel of the present embodiment in details.

In step S101, it is conducted by depositing a transparent touch-control metal layer on the inner side of the color-filter substrate 13, and then performing a patterning treatment including steps of exposing, developing and etching on the touch-control metal layer to form a plurality of touch-sensing wires 14 on the inner side of the color-filter substrate 13, wherein the touch-sensing wires 14 are used to transmit touch-sensing signals for touch-control operation. A line width of each of the touch-sensing wires 14 is preferably ranged from 3 mm to 9 mm for sensing the touch-control more effectively.

In step S102, it is conducted by depositing a black matrix layer on the inner side of the color-filter substrate 13 which already has the touch-sensing wires 14 formed thereon, and then performing another patterning treatment including steps of exposing and developing on the black matrix layer so as to form a black matrix 15 on the inner side of the color-filter substrate 13. Portions of the black matrix 15 are disposed between adjacent pixel units so as to avoid light leakage from occurring between adjacent pixels. The black matrix 15 can be directly disposed on the inner side of the color-filter substrate 13, or be disposed on the touch-sensing wires 14 of the inner side of the color-filter substrate 13.

In step S103, it is conducted by depositing a color photoresist layer on the inner side of the color-filter substrate 13 which already has the black matrix 15 formed thereon, and then performing another patterning treatment including steps of exposing and developing on the color photoresist layer so as to form red, green and blue color photoresist 16 on the inner side of the color-filter substrate 13. The color photoresist 16 are used to convert white light into colored light for displaying corresponding colored images. The color photoresist 16 may be directly disposed on the inner side of the color-filter substrate 13, or be disposed on the touch-sensing wires 14 of the inner side of the color-filter substrate 13. Portions of the black matrix 15 are positioned between the adjacent color photoresist 16.

In step S104, it is conducted by depositing a transparent common electrode layer on the inner side of the color-filter substrate 13 which already has the color photoresist 16 formed thereon, and then performing another patterning treatment including steps of exposing, developing and etching on the common electrode layer so as to form a plurality of common electrodes 17 on the color photoresist 16 and the black matrix 15 on the inner side of the color-filter substrate 13. The common electrodes 17 are used to transmit a common signal or a touch-control driving signal. For transmitting the touch-control driving signal more effectively, a line width of each of the common electrodes 17 is preferably ranged from 3 mm to 9 mm.

Figure 2:
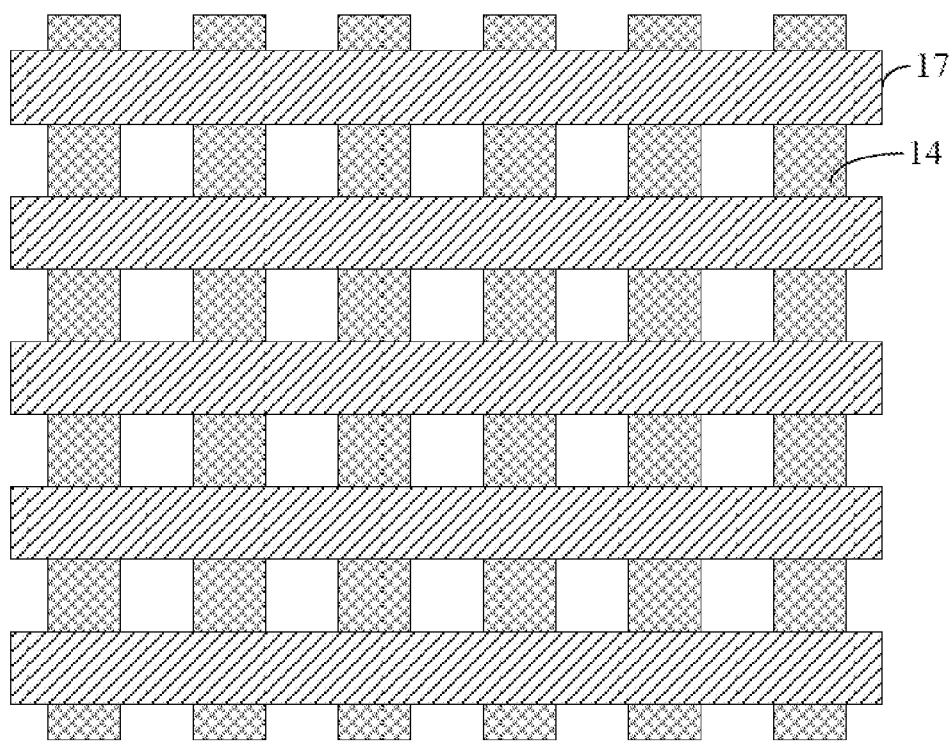
FIG. 2 is a schematic diagram showing a relative position between touch-sensing wires and common electrodes according to the first preferred embodiment of the present invention.

In the meantime, in order to have a better manipulation on touch-sensing, a projection of each of the touch-sensing wires 14 on the common electrode layer may be perpendicular to the each of the common electrodes 17, as shown in FIG. 2.

Preferably in order to ensure the display effect of the touch display panel 10, a gap between the adjacent common electrodes 17 should be smaller than a width of the black matrix 15 so that the black matrix 15 can completely cover all areas between the adjacent pixels to prevent light leakage from occurring. Then please turn to step S105.

In step S105, it is conducted by performing cell-assembling to assemble the color-filter substrate 13 which already has the common electrodes 17 formed thereon and an array substrate 19 which already has pixel electrodes (not shown in the figures) formed thereon together, so as to form a liquid crystal cell, and using spacers 18 to maintain the gap between the color-filter substrate 13 and the array substrate 19.

In step S106, it is conducted by applying an adhesive layer 12 on the outer side of the color-filter substrate 13, and then mounting a glass cover plate 11 on the outer side of the color-filter substrate 13 with the adhesive layer 12 so as to protect components inside the touch display panel 10. The specific structure of the completed touch display panel 10 is shown in FIG. 3.

After finishing the foregoing steps, the process of the manufacturing method of the touch display panel of the present embodiment is completed.

When operating the touch display panel 10, if the touch display panel 10 is in a touch-control mode, the common electrode 17 is used to transmit a touch-control driving signal so that the touch-sensing wires 14 could generate a corresponding touch-sensing signal based on a touch operation of the user and the touch-control driving signal, thereby any touch operation on the touch display panel 10 can be sensed according to the touch-sensing signal.

When the touch display panel 10 is in a display mode, the common electrodes 17 transmit a common signal, wherein the common electrodes 17 cooperates with pixel electrodes to drive liquid crystal molecules inside the liquid crystal cell to twist so that a corresponding image is displayed on the touch display panel 10. In the meantime, under the display mode, the common electrodes 17 are provided with a stable common signal, which is able to prevent the data signals on the pixel electrodes from causing interference to touch-sensing, thereby increasing the signal-to-noise ratio of touch-sensing signal and also the sensitivity of touch-control.

The manufacturing method provided by the present invention is implemented to form both the touch-control metal layer and the common electrode layer on the inner side of the color-filter substrate of the touch display panel, thus the manufacturing process is simple. Besides, while using the common electrodes as touch-control driving wires, only one more patterning treatment for forming the touch-sensing wires is needed to be added in the basic steps of the manufacturing process of the display panel, and thus the touch display panel can be made to be thinner and lighter with lower production cost.

Figure 4:
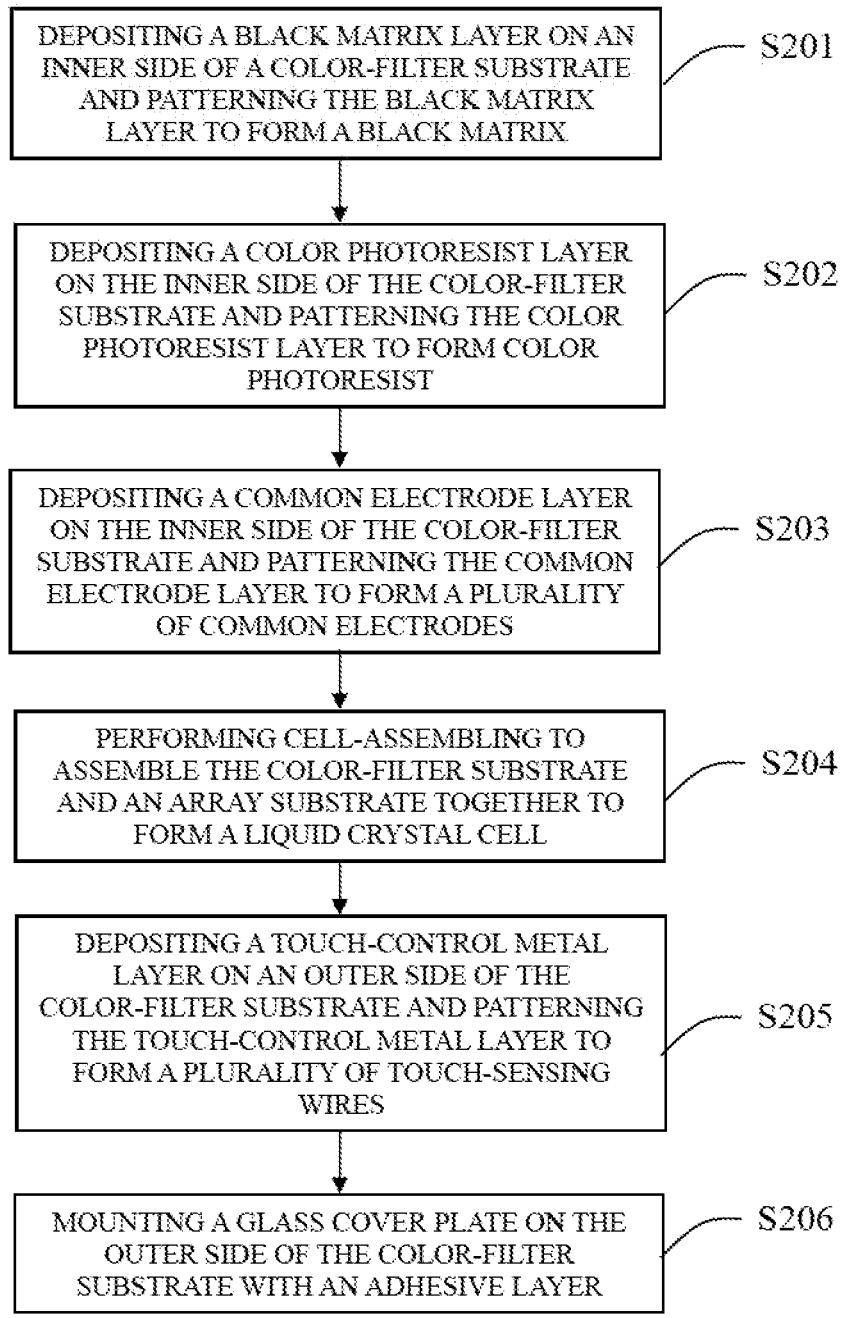
FIG. 4 is a flowchart of the manufacturing method of a touch display panel according to a second preferred embodiment of the present invention.
Figure 5:
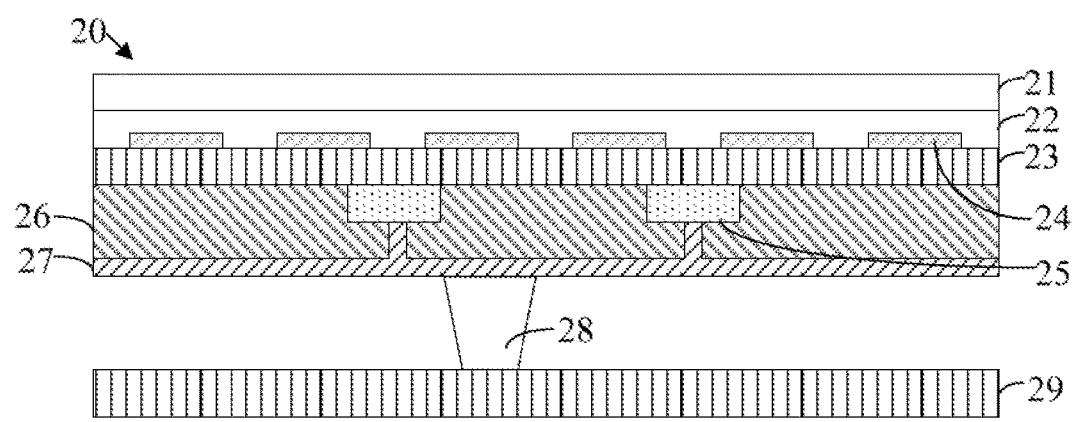
FIG. 5 is a schematic diagram showing the structure of a touch display panel formed after performing the step S206 of the manufacturing method of a touch display panel according to the second preferred embodiment of the present invention.

With reference to FIG. 4 and FIG. 5, FIG. 4 is a flowchart of the manufacturing method of a touch display panel according to a second preferred embodiment of the present invention; and FIG. 5 is a schematic diagram showing the structure of a touch display panel formed after performing the step S206 of the manufacturing method of a touch display panel according to the second preferred embodiment of the present invention. The manufacturing method of the present invention according to this preferred embodiment comprises the following steps:

Step S201: depositing a black matrix layer on an inner side of a color-filter substrate and patterning the black matrix layer to form a black matrix;

Step S202: depositing a color photoresist layer on the inner side of the color-filter substrate and patterning the color photoresist layer to form color photoresist;

Step S203: depositing a common electrode layer on the inner side of the color-filter substrate and patterning the common electrode layer to form a plurality of common electrodes;

Step S204: performing cell-assembling to assemble the color-filter substrate and an array substrate together to form a liquid crystal cell;

Step S205: depositing a touch-control metal layer on an outer side of the color-filter substrate and patterning the touch-control metal layer to form a plurality of touch-sensing wires;

Step S206: mounting a glass cover plate on the outer side of the color-filter substrate with an adhesive layer.

The manufacturing method of the touch display panel according to the present embodiment may be preferably finished in step S206.

The following description will describe the specific process of each of the steps of the manufacturing method of the touch display panel of the present embodiment in details.

In step S201, it is conducted by depositing a black matrix layer on the inner side of the color-filter substrate 23, and then performing a patterning treatment including steps of exposing and developing on the black matrix layer so as to form a black matrix 25 on the inner side of the color-filter substrate 23. Portions of the black matrix 25 are disposed between adjacent pixel units so as to avoid light leakage from occurring between adjacent pixels.

In step S202, it is conducted by depositing a color photoresist layer on the inner side of the color-filter substrate 23 which already has the black matrix 25 formed thereon, and then performing another patterning treatment including steps of exposing and developing on the color photoresist layer so as to form red, green and blue color photoresist 26 on the inner side of the color-filter substrate 23. The color photoresist 26 are used to convert white light into colored light for displaying corresponding colored images. Portions of the black matrix 25 are positioned between die adjacent color photoresist 26.

In step S203, it is conducted by depositing a transparent common electrode layer on the inner side of the color-filter substrate 23 which already has the color photoresist 26 formed thereon, and then performing another patterning treatment including steps of exposing, developing and etching on the common electrode layer so as to form a plurality of common electrodes 27 on the color photoresist 26 and the black matrix 25 on the inner side of the color-filter substrate 23. The common electrodes 27 are used to transmit a common signal or a touch-control driving signal. For transmitting the touch-control driving signal more effectively, a line width of each of the common electrodes 27 is preferably ranged from 3 mm to 9 mm.

Preferably, in order to ensure the display effect of the touch display panel 20, a gap between the adjacent common electrodes 27 should be smaller than a width of the black matrix 25 so that the black matrix 25 can completely cover all areas between the adjacent pixels to prevent light leakage from occurring.

In step S204, it is conducted by performing cell-assembling to assemble the color-filter substrate 23 which already has the common electrodes 27 formed thereon and an array substrate 29 which already has pixel electrodes (not shown in the figures) formed thereon together, so as to form a liquid crystal cell, and using spacers 28 to maintain the gap between the color-filter substrate 23 and the array substrate 29.

In step S205, it is conducted by depositing a transparent touch-control metal layer on the outer side of the color-filter substrate 23, and then performing a patterning treatment including steps of exposing, developing and etching on the touch-control metal layer to form a plurality of touch-sensing wires 24 on the outer side of the color-filter substrate 23, wherein the touch-sensing wires 24 are used to transmit touch-sensing signals for touch-control operation. A line width of each of the touch-sensing wires 24 is preferably ranged from 3 mm to 9 mm for sensing the touch-control more effectively.

In the meantime, in order to have a better manipulation on touch-sensing, a projection of each of the touch-sensing wires 24 on the common electrode layer may be perpendicular to the each of the common electrodes 27.

In step S206, it is conducted by applying an adhesive layer 22 on the outer side of the color-filter substrate 23, and then mounting a glass cover plate 21 on the outer side of the color-filter substrate 23 with the adhesive layer 22 so as to protect components inside the touch display panel 20. The adhesive layer 22 may be directly disposed on the outer side of the color-filter substrate 23, or be disposed on the touch-sensing wires 24 on the outer side of the color-filter substrate 23. The specific structure of the completed touch display panel 20 is shown in FIG. 5.

After finishing the foregoing steps, the process of the manufacturing method of the touch display panel of the present embodiment is completed.

The manufacturing method provided by the present invention is implemented to form both the touch-control metal layer and the common electrode layer on the outer side of the color-filter substrate of the touch display panel, thus the manufacturing process is simple. Besides, while using the common electrodes as touch-control driving wires, there is one patterning treatment performed on the outer side of the color-filter substrate to form the touch-sensing wires in the process. That is, only one patterning treatment is further added in the basic steps of the manufacturing process of the display panel to integrate both touch-sensing electrode and touch-control driving electrode into the touch display panel, and thus the touch display panel can be made to be thinner and lighter with lower production cost.

The manufacturing method provided by the present invention is implemented to form both the touch-control metal layer and the common electrode layer on the inner side of the touch display panel so that the manufacturing process is simple and can lower the production cost of the touch display panel, thereby solving the problem where the conventional manufacturing method of touch display panel has a complicated process and higher production cost.

The present invention has been described with preferred embodiments thereof, and it is understood that many changes and modifications to the described embodiment can be carried out without departing from the scope and the spirit of the invention that is intended to be limited only by the appended claims.

What is claimed is:

1. A manufacturing method of a touch display panel, comprising steps of:
    depositing a touch-control metal layer on an inner side of a color-filter substrate and patterning the touch-control metal layer to form a plurality of touch-sensing wires;
    depositing a black matrix layer on the inner side of the color-filter substrate and patterning the black matrix layer to form a black matrix;
    depositing a color photoresist layer on the inner side of the color-filter substrate and patterning the color photoresist layer to form color photoresist;
    depositing a common electrode layer on the inner side of the color-filter substrate and patterning the common electrode layer to form a plurality of common electrodes; and
    performing cell-assembling to assemble the color-filter substrate and an array substrate together to form a liquid crystal cell; wherein
    when the touch display panel is in a display mode, the common electrode is used to transmit a common signal;
    when the touch display panel is in a touch-control mode, the common electrode is used to transmit a touch-control driving signal; wherein
    a projection of each of the touch-sensing wires on the common electrode layer is perpendicular to the each of the common electrodes; wherein
    the black matrix has a width greater than a gap between the adjacent common electrodes.

2. The manufacturing method as claimed in claim 1, wherein a line width of each of the touch-sensing wires is ranged from 3 mm to 9 mm.

3. The manufacturing method as claimed in claim 1, wherein a line width of the common electrode is ranged from 3 mm to 9 mm.

4. The manufacturing method as claimed in claim 1, wherein after the step of performing cell-assembling to assemble the color-filter substrate and an array substrate together, the manufacturing method further comprises a step of:
    mounting a glass cover plate on an outer side of the color-filter substrate with an adhesive layer.

5. A manufacturing method of a touch display panel, comprising steps of:

depositing a touch-control metal layer on an inner side of a color-filter substrate and patterning the touch-control metal layer to form a plurality of touch-sensing wires;

depositing a black matrix layer on the inner side of the color-filter substrate and patterning the black matrix layer to form a black matrix;

depositing a color photoresist layer on the inner side of the color-filter substrate and patterning the color photoresist layer to form color photoresist;

depositing a common electrode layer on the inner side of the color-filter substrate and patterning the common electrode layer to form a plurality of common electrodes: and performing cell-assembling to assemble the color-filter substrate and an array substrate together to form a liquid crystal cell; wherein when the touch display panel is in a display mode, the common electrode is used to transmit a common signal; when the touch display panel is in a touch-control mode, the common electrode is used to transmit a touch-control driving signal.

6. The manufacturing method as claimed in claim 5, wherein a projection of each of the touch-sensing wires on the common electrode layer is perpendicular to the each of the common electrodes.

7. The manufacturing method as claimed in claim 5, wherein a line width of each of the touch-sensing wires is ranged from 3 mm to 9 mm.

8. The manufacturing method as claimed in claim 5, wherein a line width of the common electrode is ranged from 3 mm to 9 mm.

9. The manufacturing method as claimed in claim 5, wherein the black matrix has a width greater than a gap between the adjacent common electrodes.

10. The manufacturing method as claimed in claim 5, wherein after the step of performing cell-assembling to assemble the color-filter substrate and an array substrate together, the manufacturing method further comprises a step of:

mounting a glass cover plate on an outer side of the color-filter substrate with an adhesive layer.

11. A manufacturing method of a touch display panel, comprising steps of:

depositing a black matrix layer on an inner side of a color-filter substrate and patterning the black matrix layer to form a black matrix;

depositing a color photoresist layer on the inner side of the color-filter substrate and patterning the color photoresist layer to form color photoresist;

depositing a common electrode layer on the inner side of the color-filter substrate and patterning the common electrode layer to form a plurality of common electrodes;

performing cell-assembling to assemble the color-filter substrate and an array substrate together to form a liquid crystal cell; and depositing a touch-control metal layer on an outer side of the color-filter substrate and patterning the touch-control metal layer to form a plurality of touch-sensing wires; wherein when the touch display panel is in a display mode, the common electrode is used to transmit a common signal; when the touch display panel is in a touch-control mode, the common electrode is used to transmit a touch-control driving signal.

12. The manufacturing method as claimed in claim 11, wherein a projection of each of the touch-sensing wires on the common electrode layer is perpendicular to the each of the common electrodes.

13. The manufacturing method as claimed in claim 11, wherein a line width of each of the touch-sensing wires is ranged from 3 mm to 9 mm.

14. The manufacturing method as claimed in claim 11, wherein a line width of the common electrode is ranged from 3 mm to 9 mm.

15. The manufacturing method as claimed in claim 11, wherein the black matrix has a width greater than a gap between the adjacent common electrodes.

16. The manufacturing method as claimed in claim 11, wherein after the step of depositing a touch-control metal layer on an outer side of the color-filter substrate and patterning the touch-control metal layer to form a plurality of touch-sensing wires, the manufacturing method further comprises a step of:

mounting a glass cover plate on the outer side of the color-filter substrate with an adhesive layer.

* * * * *